UNITED STATES PATENT OFFICE.

MAXIMILIAN TOCH, OF NEW YORK, N. Y.

PAINT-REMOVER.

No. 871,195.   Specification of Letters Patent.   Patented Nov. 19, 1907.

Application filed October 23, 1906. Serial No. 340,143.

*To all whom it may concern:*

Be it known that I, MAXIMILIAN TOCH, a citizen of the United States, and a resident of the city of New York, borough of Manhattan, State of New York, have invented certain new and useful Improvements in Paint-Removers, of which the following is an exact description.

In removing paint and varnish from painted and varnished surfaces, liquids are applied which soften the paint and varnish. If vertical surfaces are to be treated, liquids must be applied which do not run off quickly. I have now found that by the addition of naphthalene, which is a hydrocarbon in solid form, to organic solvents a liquid is obtained which adheres firmly to the paint and varnish and makes its removal easy and quick. The addition of this solid hydrocarbon distinguishes my paint remover from all other preparations of this kind heretofore described. Naphthalene serves two purposes in my paint remover. First it prevents the solution from running off quickly and second: after evaporation of the solvent it is left on the treated surface as a fine coating which softens and dissolves the paint and varnish. The paint removers of the old art generally contain mostly benzol or its equivalents, which act as solvents for the paint and varnish, and wax and its equivalents, which prevent the solution from running off easily. Naphthalene combines the functions of both, and in addition acts more quickly and reliably.

In carrying out my invention practically, I can proceed as follows: One gallon of acetate of amyl, one gallon of amylic alcohol, one gallon of wood turpentine and ten gallons of crude wood alcohol are treated with five pounds of naphthalene. Good results were also obtained by mixing: 12 pounds of naphthalene with 10 gallons of crude wood alcohol, or 12 pounds of naphthalene with 3 gallons of oil turpentine and 7 gallons of crude wood alcohol, or 12 pounds of naphthalene with 3 gallons of amylic alcohol and 7 gallons of crude wood alcohol, or 16 pounds of naphthalene are dissolved in a mixture of 1 gallon of acetate of amyl, 1 gallon of amylic alcohol, 1 gallon of wood turpentine, 10 gallons of crude wood alcohol, $\frac{1}{2}$ gallon of litharge boiled oil and $\frac{3}{4}$ pint of oil of eucalyptus. The thus obtained liquids do not run off easily from vertical surfaces, and soften old paint and varnish quickly.

Although I have above described a few examples by which my new paint remover may be obtained, I do not wish to be understood as excluding from my claims equivalents for the ingredients, the apparatus, or the operations employed in the process. It is probable that substitutes may be employed without departing from the scope of the process intended to be secured hereby.

Having now described my invention and in what manner the same is to be performed, what I claim as new and desire to secure by Letters Patent, is:

The new paint remover, consisting of a solution of naphthalene in acetate of amyl, amylic alcohol, crude wood alcohol, and wood turpentine, substantially as hereinbefore described.

MAXIMILIAN TOCH.

Witnesses:
O. M. KOHN,
CHARLES E. KRONBERG.